Aug. 14, 1934.   R. W. CHANDLER   1,970,165
OIL SEAL
Filed March 17, 1933
Fig.1
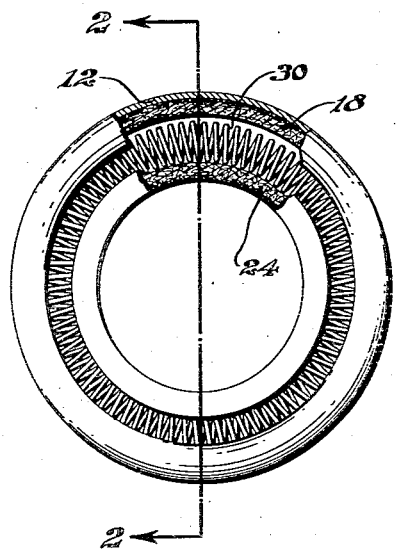
Fig.2
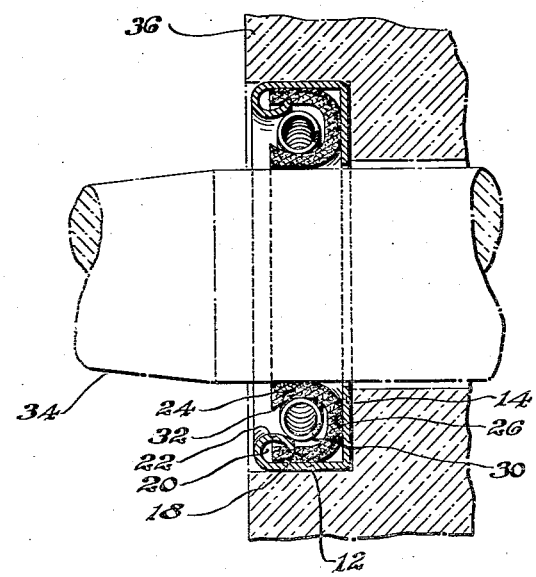
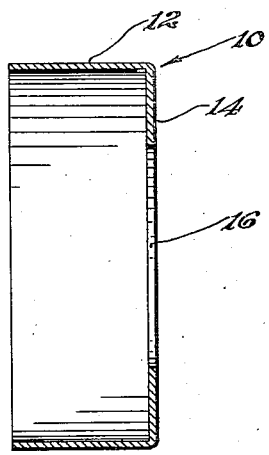
Fig.3
Witness
Paul F. Bryant
Inventor
Robert W. Chandler
by his attorneys
Fish Hildreth Cary & Jenney

UNITED STATES PATENT OFFICE 1,970,165

OIL SEAL

Robert W. Chandler, Worcester, Mass., assignor to Graton & Knight Company, Worcester, Mass., a corporation of Massachusetts Application March 17, 1933, Serial No. 661,335

1 Claim. (Cl. 288—1)

The present invention relates to oil seals, and more particularly to self-contained units of this character which are designed for insertion in encompassing relation to a rotating shaft or the like along which oil, grease or other liquid or gas seepage normally takes place.

The purpose and object of the invention is to produce a self-contained seal comprising a flexible sealing gasket secured in a containing metallic housing formed as a unitary construction and maintained within a reasonably close tolerance as to dimensions in order that it shall fit closely within the bearing housing.

With this and other objects in view, the various features of the invention consists in certain novel features of construction, combinations and arrangements of parts hereinafter described and claimed, the advantages of which will be obvious to those skilled in the art from the following description.

In the accompanying drawing illustrating the preferred form of the invention, Fig. 1 represents an elevation partly in section of the seal assembly. Fig. 2 is a section of the assembly on the line 2—2 of Fig. 1; and Fig. 3 is a detail illustrating the cup drawn housing member before insertion and assembly of the sealing gasket therein.

The seal shown in the illustrated embodiment of the invention comprises generally a one-piece metallic housing member of generally cylindrical contour, partially closed at one end by an inwardly extending and generally radial flange, and having at its opposite end a portion turned inwardly and rearwardly in a generally axial direction to provide a circumferential space for receiving and clamping the outer portion of a flexible gasket member. The flexible gasket member, which is preferably and conveniently made of leather or equivalent material, is provided with an outer clamping portion of generally cylindrical contour extending axially of the housing, and designed to be received and clamped within the circumferential space provided in the housing. The gasket member is also provided with an inner and axially extending sleeve of reduced diameter which encompasses the rotating shaft and seals against leakage of grease, this sealing engagement being maintained in general by a simple form of spring surrounding the reduced sealing portion of the gasket. The gasket is preferably made as an integral member with the sealing and clamping portions connected by a fold or bend which serves much in the manner of a bellows or diaphragm to allow the sealing portion of the gasket to follow slight eccentricities of the shaft within its bearing without losing sealing engagement therewith.

Referring particularly to the drawing, it will be observed from an inspection of Fig. 3 that the housing member is first made as a drawn metal cup 10, having a generally cylindrical periphery 12 partially closed at the bottom by a radial flange 14, which, however, is provided with an opening 16 substantially larger than the shaft to be passed therethrough. The sides 12 of the cup are of such length as to permit the open end to be turned backwardly on itself to provide for clamping the outer portion of a gasket received and assembled therein. The outer periphery of the housing 10 accurately fits the shaft housing within which the grease retainer is received. Cooperating with the one-piece housing is a flexible gasket of leather or the like, having an outer clamping portion 18 which is received within a circumferential space 20 formed in the housing and clamped therein by the rearwardly turned end 22 of the housing, as indicated. The outer or clamping end of the gasket is generally cylindrical, and lies within the space provided by the outer wall of the housing. The inner or free end of the gasket indicated at 24 is also generally cylindrical, and surrounds the shaft in encompassing relation thereto. This may be termed for convenience the sealing end of the gasket, and due to its axial projection lengthwise of the shaft, affords sufficient boring area to adequately seal against seepage. The clamping and sealing ends of the gasket, whether in alignment or offset with relation to one another in an axial direction, are connected by an integral fold or bend which permits the necessary flexibility and movement of the inner sealing end with the encompassed shaft. In the actual embodiment of the invention this is conveniently secured by molding the gasket in generally U-shaped form, the bottom of the U indicated at 26 forming the connecting bend, and the clamping or sealing ends of the gasket forming the legs of the U. The free or sealing end of the gasket is maintained in sealing contact by a coiled garter spring 30 or the like, which surrounds the free end of the gasket opposite the sealing area and which may be retained in approximate position by slightly upsetting the free end of the gasket or ring at 32. It will be evident that the spring is maintained in assembled relationship by the rearwardly turned portion 22 of the housing, which at the same time clamps and locks the outer end of the gasket in assembled relationship. The mid portion or bend of the gasket may or may not bear against the radial flange 14, which tends to substantially close this end of the unit.

The unit as a whole surrounds a shaft indicated at 34, which rotates within a housing 36.

What is claimed is:

As an article of manufacture, a self-contained seal comprising a one-piece cupped housing having a cylindrical wall and a rearwardly and inwardly curled portion formed at the open end of the housing to provide a circumferential sealing space adjacent the cylindrical wall, a flexible sealing ring of generally U-shaped form having an outer axially extending portion concentric with the wall of the housing and an inner sealing portion extending axially of the shaft with a return bend integrally connecting the two portions adjacent the cupped end, a spring engaging with the free or sealing portion of the ring to maintain sealing engagement, and the inwardly curled portion of the housing at its free edge engaging with the outer concentric portion of the ring and the spring to clamp the ring securely to the cylindrical wall of the housing and maintain the spring in assembled relation.

ROBERT W. CHANDLER.